United States Patent
Drozdová et al.

(10) Patent No.: US 10,633,745 B2
(45) Date of Patent: Apr. 28, 2020

(54) CORROSION PROTECTION OF SEALING GAP BETWEEN ALUMINUM ALLOY AND GASKET

(71) Applicant: Hanon Systems, Daejeon (KR)

(72) Inventors: Zita Drozdová, Frydek-Mistek (CZ); Petr Kijonka, Novy Jicin (CZ); Jan Povýšil, Prerov (CZ); Petr Kolder, Rožnov pod Radhoštěm (CZ)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/689,636

(22) Filed: Aug. 29, 2017

(65) Prior Publication Data

US 2018/0080129 A1    Mar. 22, 2018

(30) Foreign Application Priority Data

Sep. 20, 2016   (CZ) ................ PV2016-577

(51) Int. Cl.
| | |
|---|---|
| *C23F 13/00* | (2006.01) |
| *F16B 5/00* | (2006.01) |
| *F28F 19/00* | (2006.01) |
| *C23F 13/10* | (2006.01) |
| *F28F 21/06* | (2006.01) |
| *F28F 21/08* | (2006.01) |
| *F28F 9/02* | (2006.01) |

(52) U.S. Cl.
CPC ............ *C23F 13/005* (2013.01); *C23F 13/10* (2013.01); *F16B 5/0016* (2013.01); *F28F 9/0226* (2013.01); *F28F 19/004* (2013.01); *F28F 21/06* (2013.01); *F28F 21/084* (2013.01); *F28F 9/0224* (2013.01); *F28F 2225/08* (2013.01); *F28F 2230/00* (2013.01); *F28F 2275/122* (2013.01)

(58) Field of Classification Search
CPC ....... C23F 13/005; C23F 13/10; F28F 9/0226; F28F 9/0224; F28F 19/004; F28F 21/06; F28F 21/084; F28F 2225/08; F28F 2275/122
USPC ....................................... 165/173
See application file for complete search history.

(56) References Cited

U.S. PATENT DOCUMENTS

| | | | | |
|---|---|---|---|---|
| 4,351,390 A | * | 9/1982 | Argyle ................ | F28F 9/0226 165/149 |
| 4,632,885 A | * | 12/1986 | Tanabe ................ | C23C 30/00 420/542 |
| 4,776,392 A | | 10/1988 | Loyd | |

(Continued)

FOREIGN PATENT DOCUMENTS

| | | |
|---|---|---|
| DE | 102008033222 A1 | 1/2010 |
| EP | 1703243 A1 | 9/2006 |

(Continued)

OTHER PUBLICATIONS

English translation WO2016/046272.*

*Primary Examiner* — Joel M Attey
(74) *Attorney, Agent, or Firm* — Shumaker, Loop & Kendrick, LLP; James D. Miller (57) ABSTRACT

A tank assembly for a heat exchanger includes a tank having a heat exchange end defining an opening and a reinforcement structure. The reinforcement structure has a shape substantially corresponding to a shape of an outer perimeter of the tank and disposed about the outer perimeter of the tank. The reinforcement structure is a sacrificial anode.

17 Claims, 6 Drawing Sheets

(56) References Cited

U.S. PATENT DOCUMENTS

| | | | |
|---|---|---|---|
| 6,643,133 B1 * | 11/2003 | Liu | H01L 23/4093 |
| | | | 165/185 |
| 9,470,461 B2 | 10/2016 | Merklein et al. | |
| 2006/0185833 A1 * | 8/2006 | Brost | F28D 1/05366 |
| | | | 165/149 |
| 2008/0047843 A1 * | 2/2008 | Glass | C23F 13/06 |
| | | | 205/730 |

FOREIGN PATENT DOCUMENTS

| | | |
|---|---|---|
| FR | 2742528 A1 | 6/1997 |
| JP | S58179797 A | 10/1983 |
| JP | S58187798 A | 11/1983 |
| JP | S6159199 A | 3/1986 |
| WO | 2016046272 A1 | 3/2016 |

\* cited by examiner

CORROSION PROTECTION OF SEALING GAP BETWEEN ALUMINUM ALLOY AND GASKET

CROSS-REFERENCE TO RELATED APPLICATIONS

This application claims the benefit of Czech Republic Patent Application Ser. No. CZ PV 2016-577, filed on Sep. 20, 2016. The entire disclosure of the above patent application is hereby incorporated herein by reference.

FIELD OF THE INVENTION

The invention relates to a heat exchanger for a vehicle, and more particularly, to a tank configuration for a heat exchanger with maximized corrosion resistance.

BACKGROUND

As is commonly known, heat exchangers are employed in vehicles to cool air and engine components. Heat exchangers can include a plastic or aluminum tank connected to the heat exchanger assembly. A header is disposed intermediate the heat exchange assembly and the tank and is typically formed from an aluminum or an aluminum alloy. A seal is typically disposed intermediate the header and the tank to mitigate leakage of air.

However, the aluminum of the header easily corrodes, which minimizes an integrity of an interface between the header and the tank, and thus limits the life of the heat exchanger. Known assemblies have attempted solutions to avoid corrosion. For example, in Japanese Patent Application No. JPS58-179797, the entire disclosure of which is hereby incorporated in its entirety herein, employs an aluminum iron plate. The aluminum iron plate covers an outer surface of the interface between the tank and the header.

In another example, Japanese Patent Application No. JPS58-187798 discloses a low voltage metal layer with a low electrode potential with a thickness of 20 to 80 microns formed over the entire surface of the tank formed from plastic. In yet another example, Japanese Patent Application No. JPU S56-169195, the entire disclosure of which is hereby incorporated in its entirety herein, describes the use of a low electrode metal element inserted in the inlet portion of the tank and in contact with the header.

However, the above-mentioned solutions maximize manufacturing and assembly complexity and costs, which is undesired.

Accordingly, it is desired to have a heat exchanger tank assembly formed from minimal components that minimizes manufacturing and assembly costs and minimizes leakage.

SUMMARY OF THE INVENTION

In concordance with the instant disclosure, a simple housing for a heat exchanger formed from minimal components that minimizes manufacturing and assembly costs and minimizes leakage is discovered.

According to a first embodiment of the disclosure, a tank assembly for a heat exchanger includes a tank having a heat exchange end defining an opening and a reinforcement structure. The reinforcement structure has a shape substantially corresponding to a shape of an outer perimeter of the tank and disposed about the outer perimeter of the tank. The reinforcement structure is a sacrificial anode.

According to another embodiment of the disclosure, a tank assembly for a heat exchanger is disclosed. The tank assembly includes a tank having a heat exchange end defining an opening and a header receiving the heat exchange end of the tank and having an outer wall overlapping an outer perimeter of the tank adjacent the heat exchange end. The tank assembly further discloses a reinforcement structure encompassing the outer perimeter of the tank and disposed intermediate the tank and the outer wall of the header.

According to yet another embodiment of the disclosure, a method of forming a tank assembly is disclosed. The method includes the steps of providing a tank having a heat exchange end defining an opening and crimping a header to the tank at the heat exchange end of the tank. The method further includes the step of forming a reinforcement structure having a shape substantially corresponding to a shape of a perimeter of the tank from a metal having an electrode potential less than an electrode potential of at least one of the tank and the header. The method further includes the step of positioning the reinforcement structure about the tank intermediate the tank and the header.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially"

means "mostly, but not perfectly" or "approximately" as a person skilled in the art would recognize in view of the specification and drawings.

FIGS. 1-5 illustrate a heat exchanger tank assembly 10 of a heat exchanger according to an embodiment of the disclosure. As illustrated, the tank assembly 10 is configured to be combined with a heat exchanger, for example. Specifically, the tank assembly 10 is configured for coupling to a heat exchange core (not shown) which exchanges heat between fluids such as a coolant and air, for example. At least a portion of the heat exchange core is formed from an aluminium or an aluminium alloy. It is understood the tank assembly 10 can be configured for any type of heat exchanger commonly employed in vehicle systems such as used for a water-cooled charge air cooler, an air-cooled charge air cooler, a tube-type heat exchanger, a radiator, an oil cooler, or other heat exchanger now known or later developed.

The tank assembly 10 includes a tank 12 for receiving or conveying air or other fluid through the heat exchanger. The tank 12 includes a heat exchange end 13 with an opening 14 providing fluid communication between the tank 12 and the heat exchange core. The tank 12 is formed from a plastic, an aluminium, or an aluminium alloy, for example. Although, it is understood the tank 12 can be formed from any material as desired. The tank assembly 10 further includes a reinforcement structure 16, a header 18, and a seal 19.

The reinforcement structure 16 is disposed about a perimeter of the tank 12 in a recess 20 adjacent the heat exchange end 13. The reinforcement structure 16 is configured as a sacrificial anode and formed from a metal having an electrode potential less than an electrode potential of the tank 12 and the header 18, if formed from a metal. As used herein, a sacrificial anode is a highly active metal used to prevent a less active material surface from corroding. Sacrificial anodes are created from a metal or metal alloy with a more negative electrochemical potential than another metal the sacrificial anode is intended to protect. The sacrificial anode is consumed in place of the metal the sacrificial anode is protecting, which is why it is referred to as a "sacrificial" anode. For example, the reinforcement structure 16 can be formed from a zinc, a magnesium, and alloys thereof. As shown, the reinforcement structure 16 is a substantially planar strip of material bent to a shape substantially corresponding to a cross-sectional shape of the tank 12. In the example shown, the reinforcement structure 16 has a substantially rectangular shape to correspond to the substantially rectangular cross-sectional shape of the tank 12 adjacent the heat exchange end 13. In other embodiments, the reinforcement structure 16 can be a metal wire with a circular cross-section, or other shapes and configurations as desired. The reinforcement structure 16 can be formed by an extrusion process or a molding process and bent or pressed to shape by a stamping process for example. However, other processes are contemplated for forming the reinforcement structure 16.

Figure 1:
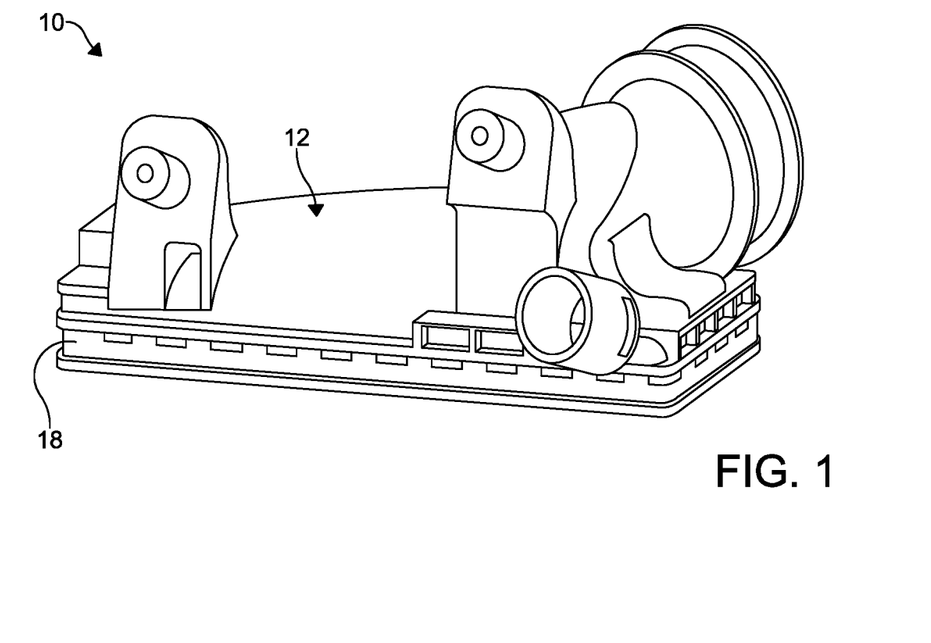
FIG. 1 is an assembled top perspective view of a heat exchanger tank assembly according to an embodiment of the disclosure.
Figure 2:
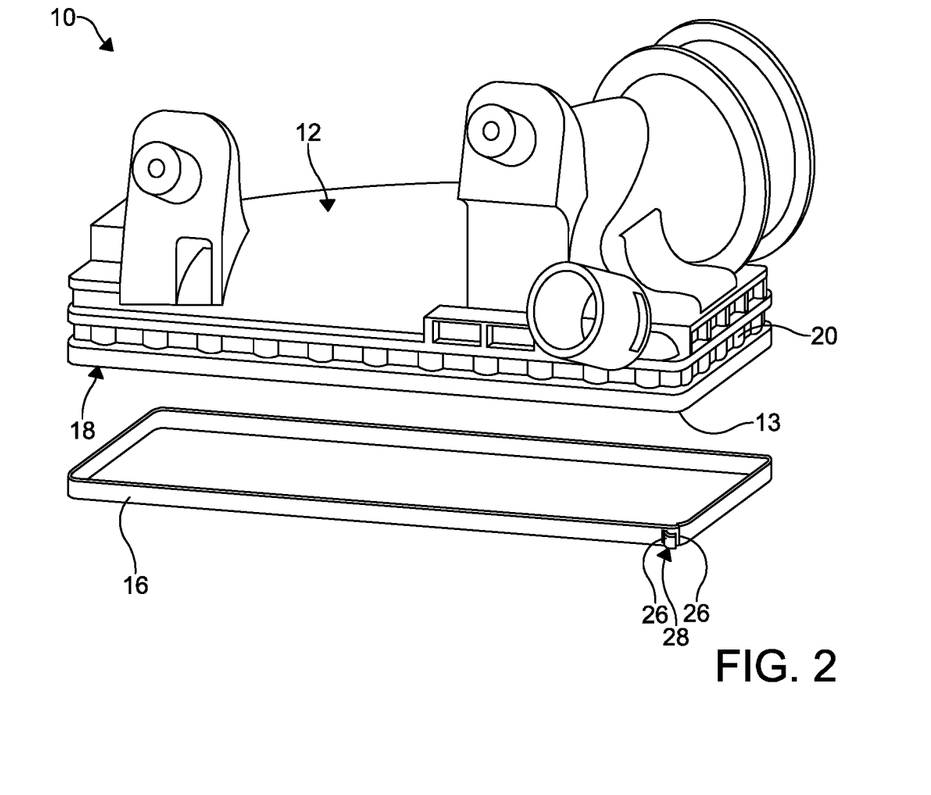
FIG. 2 is a partially exploded top perspective view of a reinforcement structure and a tank of the heat exchanger tank assembly of FIG. 1.
Figure 3:
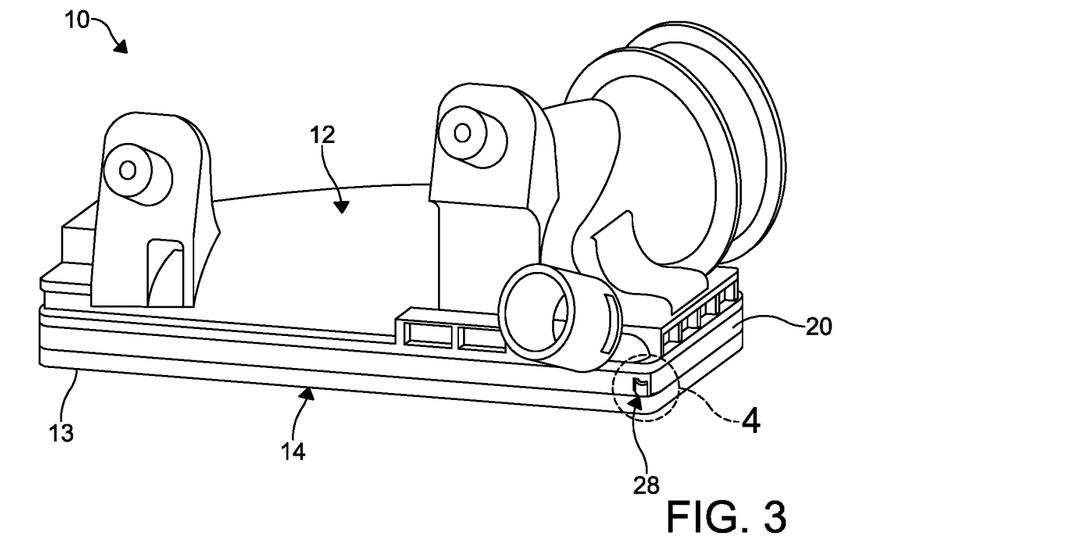
FIG. 3 is an assembled top perspective view of the reinforcement structure and tank of the heat exchanger tank assembly of FIGS. 1-2.
Figure 4:
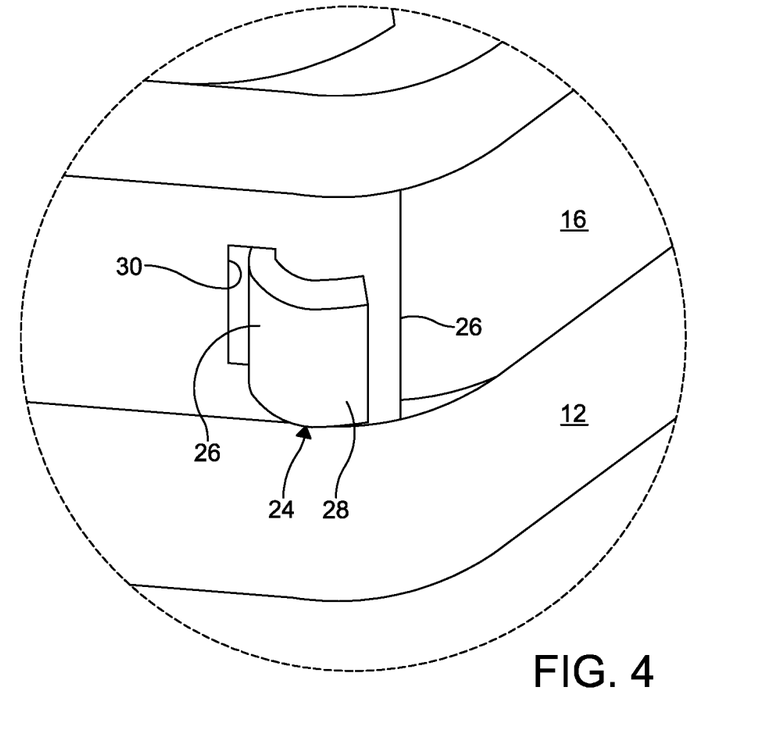
FIG. 4 is an enlarged fragmentary perspective view of a locking feature of the reinforcement structure of FIGS. 2-3, highlighted by circle 3 in FIG. 3.

The reinforcement structure 16 can be formed from a single unitary structure, as shown, or formed from multiple structures. A locking feature 24 joins ends 26 of the reinforcement structure 16 to form a continuous enclosure about the perimeter of the tank 12 when disposed about the tank 12. In the embodiment illustrated, the locking feature 24 includes a fastener 28 disposed at a first one of the ends 26 of the reinforcement structure 16 engaging a slot 30 formed at a second one of the ends 26 of the reinforcement structure 16. The locking feature 24 secures the reinforcement structure 16 about the tank 12. It is understood, the locking feature 24 can include other fasteners or locking features as desired. For example, the locking feature 24 can include having the ends 26 brazed together, a bolt, a weld, or any other coupling features used to join the ends 26 together. It is desirable for the locking feature 24 to be formed in a bend of the reinforcement structure 16 such as a corner of the reinforcement structure 16. Although, the locking feature 24 can be formed at other portions of the reinforcement structure 16, as desired.

Figure 5:
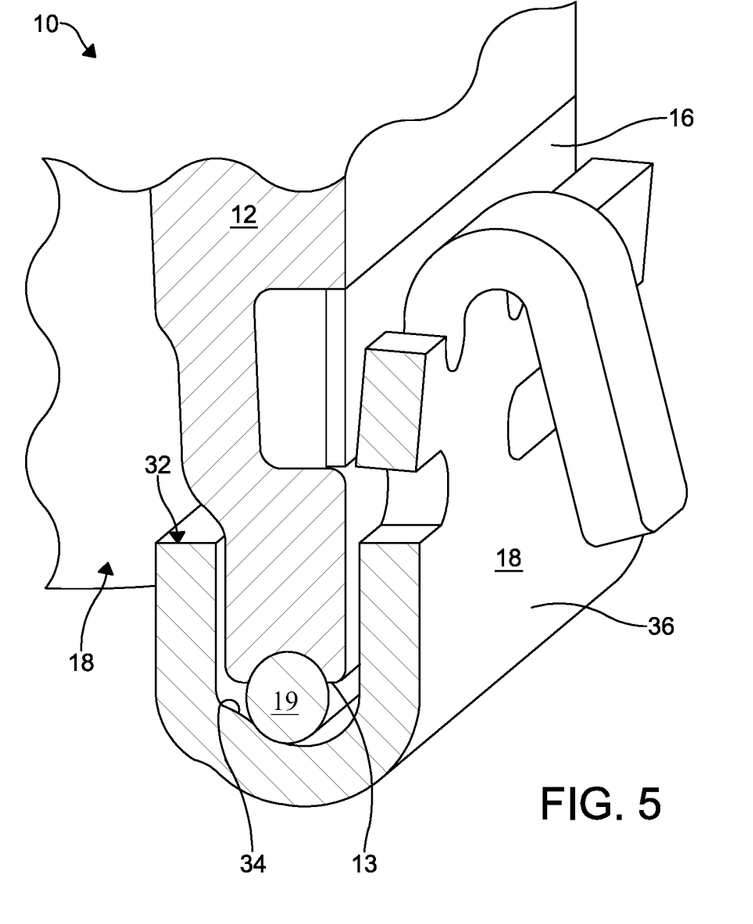
FIG. 5 is a fragmentary cross-sectional top perspective view of the tank, a reinforcement structure, a header, and a seal of the heat exchange tank assembly of FIG. 1.

The header 18 is formed from an aluminium or an aluminium alloy and is configured to couple the tank 12 to the heat exchange core. The header 18 has a substantially rectangular frame 32 having a recess 34 formed therein for receiving the heat exchange end 13 of the tank 12. As shown in FIG. 5, the frame 32 has a substantially U-shaped cross-section. An outer wall 36 of the frame 32 extends around the perimeter of the tank 12 and covers at least a portion of the reinforcement structure 16, wherein the reinforcement structure 16 is disposed intermediate the outer perimeter of the tank 12 and outer wall 36 of the frame 32. The seal 19 is disposed intermediate the heat exchange end 13 of the tank 12 and the header 18 within the recess 34. The seal 19 militates against leakage between the tank 12 and the header 18.

To assemble the tank assembly 10, the tank 12 is formed from a manufacturing process such as a molding process, for example. The reinforcement structure 16 is formed from the manufacturing process and is received in the recess 20 of the tank 12. The reinforcement structure is secured to the tank 12 with the locking feature 24 which joins the ends 26 of the reinforcement structure 16. The heat exchange end 13 of the tank 12 is received in the recess 34 of the header 18. The outer wall 36 of the frame 32 of the header 18 extends outwardly from the outer perimeter of the tank 12 prior to a crimping process. The outer wall 36 is them crimped inwardly towards the outer perimeter of the tank 12 to engage the header 18 with the tank 12, and thus reinforce and secure the seal 19 and the reinforcement structure 16 to the tank assembly 10.

FIGS. 6-9 illustrate a tank assembly 10' according to another embodiment of the disclosure. Features similar to the features of the tank assembly 10 of FIGS. 1-5 are illustrated with the same reference numeral and a prime (') symbol for reference. The tank assembly 10' of FIGS. 6-9 is substantially similar to the tank assembly 10 of FIGS. 1-5, except the reinforcement structure 16' is different. It should also be noted the tank 12' of FIGS. 6-9 has a different configuration as to represent a tank of a different type compared to the tank 12 of FIGS. 1-5. However, features described hereinafter with respect to FIGS. 6-9 can be employed or formed with the tank 12 of FIGS. 1-5 and the features described hereinabove with respect to the tank 12 of FIGS. 1-5 can be employed or formed with the tank 12' of FIGS. 6-9. It is also understood the tanks 12, 12' can employ many various configurations or shapes as desired depending on the type of heat exchanger.

The reinforcement structure 16' of the tank assembly 10' is substantially similar to the reinforcement structure 16 of FIGS. 1-5, however, the reinforcement structure 16' is assembled to the tank 12' during a molding process of the tank 12'. The reinforcement structure 16' is positioned within a mold used for forming the tank 12' prior to forming the tank 12'. The tank 12' is then molded within and around portions of the reinforcement structure 16' within the same mold to join the reinforcement structure 16' thereto at a position adjacent the heat exchange end 13'. When the tank assembly 10' is assembled, the reinforcement structure 16' is disposed intermediate the outer wall 36' of the header 18' and the outer perimeter of the tank 12'.

Figure 6:
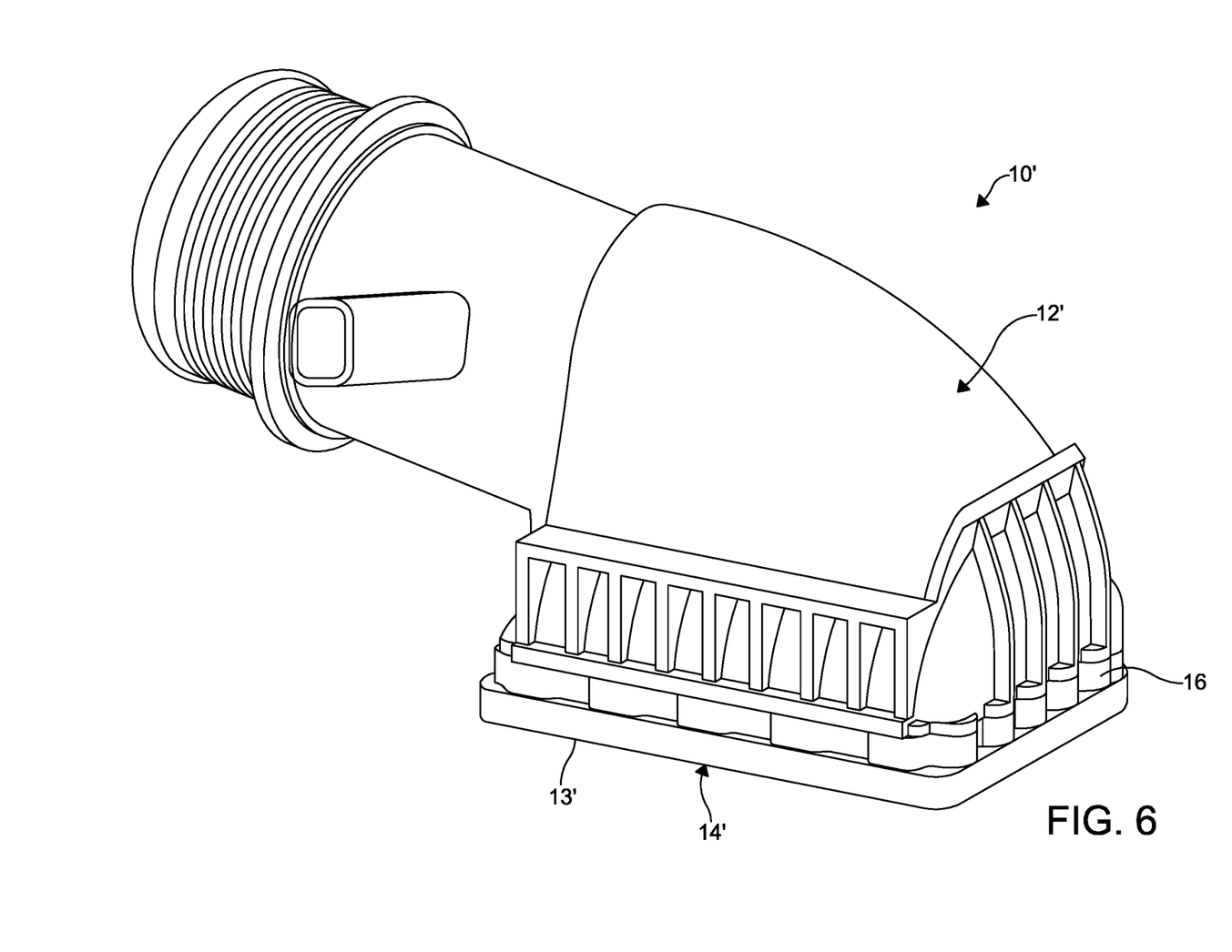
FIG. 6 is a right side perspective view of a tank and a reinforcement structure of a heat exchanger tank assembly according to another embodiment of the disclosure.
Figure 7:
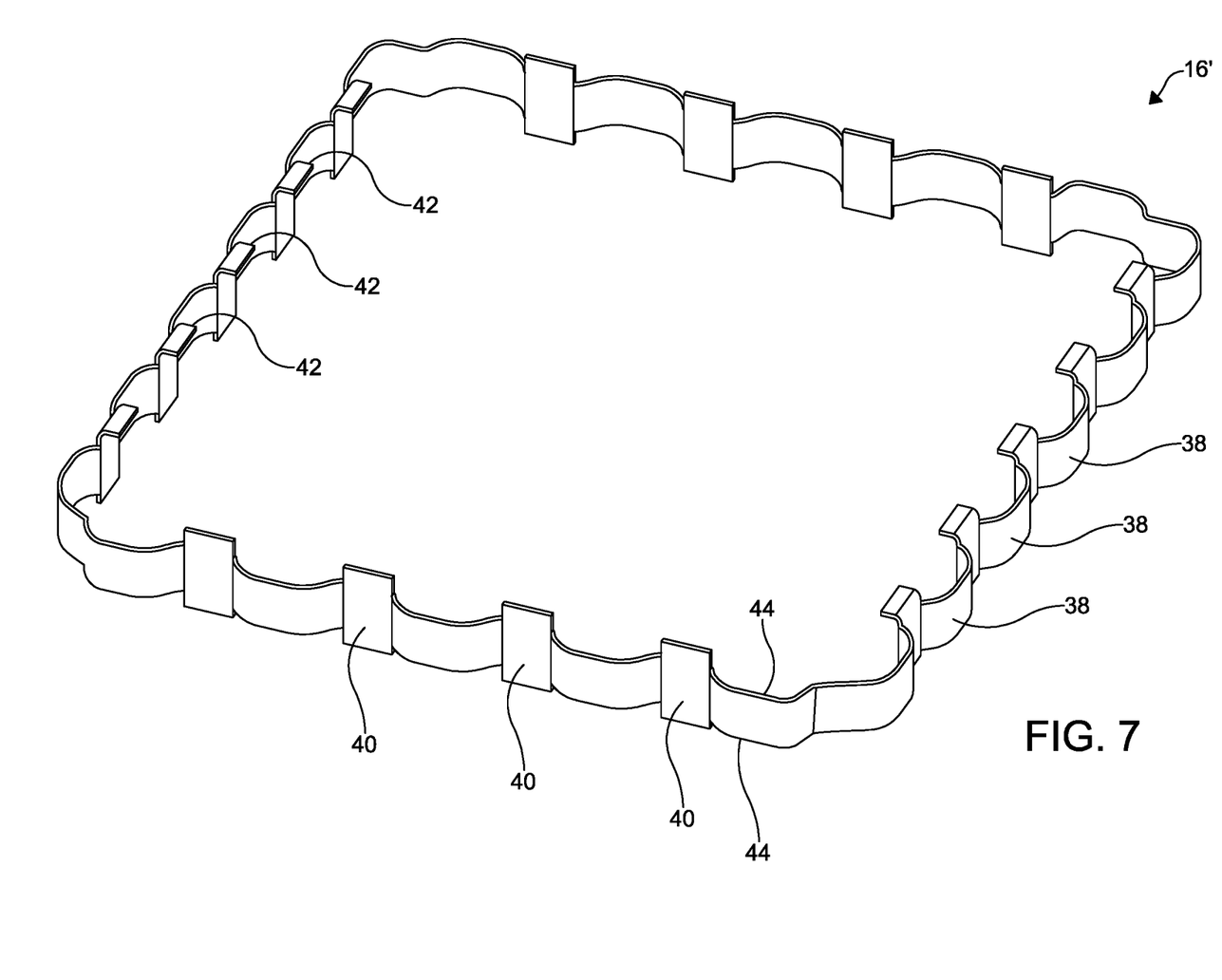
FIG. 7 is an enlarged right side perspective view of the reinforcement structure of the heat exchanger tank assembly of FIG. 6.
Figures 8, 9:
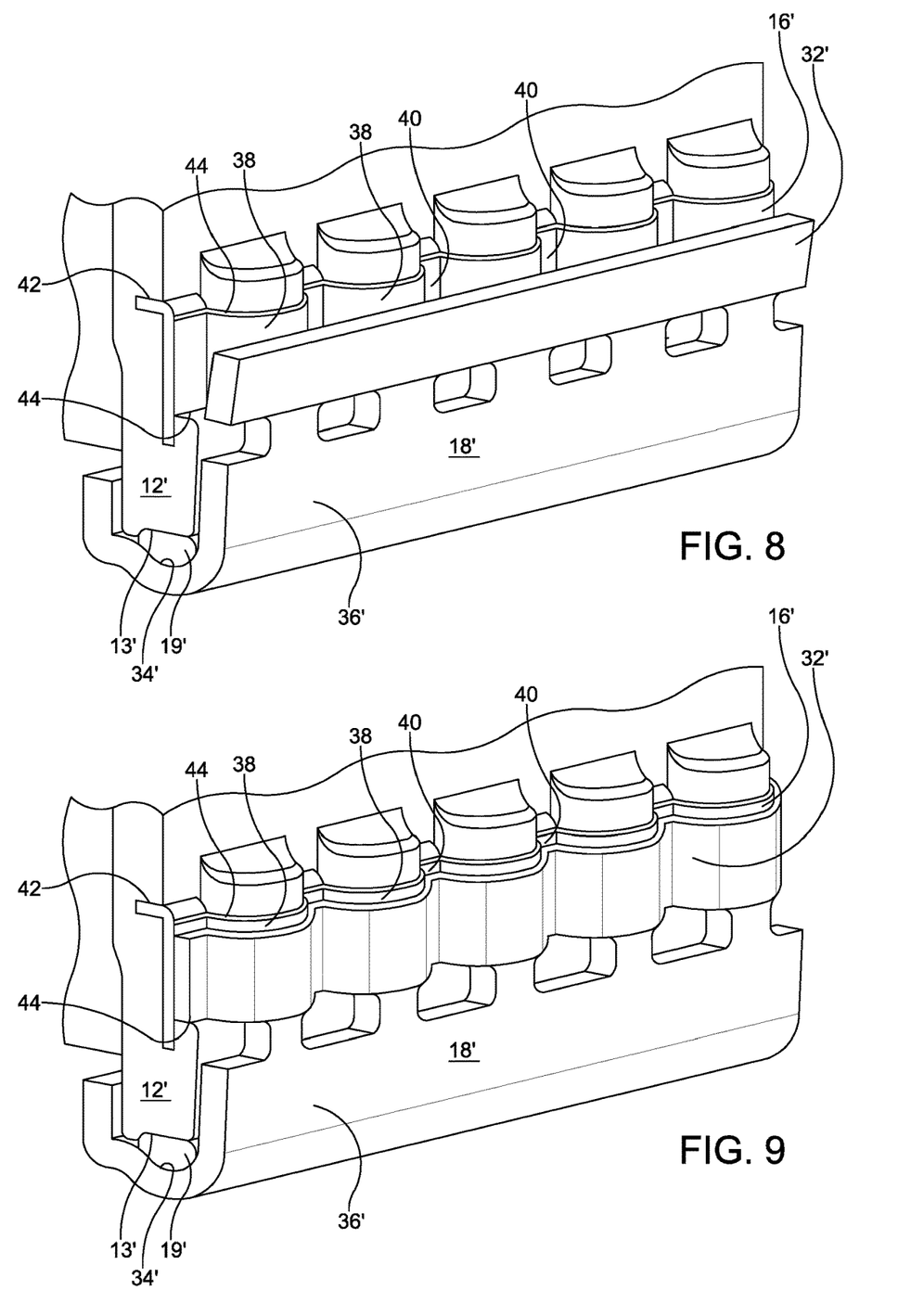
FIG. 8 is an enlarged fragmentary cross-sectional right side perspective view of the tank, the reinforcement structure, a header, and a seal of the heat exchanger tank assembly of FIG. 6, shown in a pre-crimped configuration.
FIG. 9 is an enlarged fragmentary cross-sectional right side perspective view of the tank, the reinforcement structure, the header, and the seal of the heat exchanger tank assembly of FIG. 8, shown in a post-crimped configuration.

As illustrated, the reinforcement structure 16' includes a plurality of extensions or protuberances 38 interposed between a plurality of planar strips 40 corresponding to bulges and recesses formed on the outer perimeter of the tank 12', wherein an entirety of an inner surface of the reinforcement structure 16' abuts the outer perimeter of the tank 12'. The strips 40 have a width greater than a width of the reinforcement structure 16' at the bulges 38, wherein the strips 40 extend laterally outwardly from edges 44 of the reinforcement structure 16'. At least a portion of the strips 40 include inwardly extending tabs 42 formed thereon. During the molding process of the tank 12', the tank 12' is molded around the portion of the strips 40 extending outwardly from the edges 44 and the tabs 42 to secure the reinforcement structure 16' thereto. The strips 40 can be separately formed from the reinforcement structure 16' and coupled thereto or integrally formed with the reinforcement structure 16'. It is understood the reinforcement structure 16' may have other shapes and configurations to correspond to the configuration of the tank 12'.

Similar to the reinforcement structure 16 of FIGS. 1-5, the reinforcement structure 16' is configured as a sacrificial anode. The reinforcement structure 16' may be formed from a single unitary structure or multiple structures and may be a continuous enclosure or may include two opposing ends forming an opening so the reinforcement structure 16' can expand or contract.

To assemble the tank assembly 10', the reinforcement structure 16' is formed by the manufacturing process and is positioned in the mold for forming the tank 12'. The material, such as a plastic, is placed in the mold for the molding process to form the tank 12' around the reinforcement structure 16'. The outer wall 36' of the frame 32' of the header 18' extends outwardly from the outer perimeter of the tank 12' prior to a crimping process. The outer wall 36' is them crimped inwardly towards the outer perimeter of the tank 12' to engage the header 18' with the tank 12', and thus reinforce and secure the seal 19' and the reinforcement structure 16' in the tank assembly 10'.

Advantageously, the tank assembly 10, 10' according to the present disclosure minimizes the number of components required for a tank assembly 10, 10' and complexity and cost of manufacturing the tank assembly 10,10'. Additionally, the tank assembly 10, 10' minimizes corrosion such as between the header 18, 18' and tank 12, 12' by the use of the reinforcement structure 16, 16' configured as a sacrificial anode.

Tests have shown that certain tank assemblies according to prior art showed leakage between a header and a tank after approximately 205 hours with a corrosion test. The tank assemblies 10, 10' according to the present disclosure underwent the same corrosion tests and leakage was not indicated until more than approximately three times the number of hours of testing of prior art tank assemblies (i.e. greater than 600 hours, and more specifically between 600-1100 hours).

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tank assembly for a heat exchanger:
   a tank having a heat exchange end defining an opening; and
   a reinforcement structure having a shape corresponding to a shape of a perimeter of the tank and disposed around the perimeter of the tank, the reinforcement structure including a sacrificial anode, wherein the reinforcement structure is formed from a metal having an electrode potential less than an electrode potential of the tank, wherein the reinforcement structure includes opposing ends and a locking feature joining the ends to secure the reinforcement structure about the tank, and wherein the locking feature is integrally formed with the reinforcement structure.

2. The tank assembly of claim 1, wherein the tank includes a recess formed adjacent the heat exchange end thereof, and wherein the reinforcement structure is disposed within the recess.

3. The tank assembly of claim 1, wherein the reinforcement structure is formed from one of a substantially planar strip and a wire.

4. The tank assembly of claim 1, wherein the reinforcement structure includes a plurality of strips extending laterally outwardly therefrom.

5. The tank assembly of claim 4, wherein a portion of the plurality of strips includes tabs extending inwardly from the reinforcement structure.

6. The tank assembly of claim 1, wherein the tank is molded to surround at least part of the reinforcement structure.

7. The tank assembly of claim 1, wherein the reinforcement structure is formed from one of a zinc, a magnesium, a zinc alloy, and a magnesium alloy.

8. The tank assembly of claim 1, further comprising a header receiving the heat exchange end of the tank, wherein an outer wall of the header covers a portion of the reinforcement structure.

9. The tank assembly of claim 8, further comprising a seal disposed intermediate the header and the tank.

10. A tank assembly for a heat exchanger:
    a tank having a heat exchange end defining an opening;
    a header receiving the heat exchange end of the tank and having an outer wall overlapping an outer perimeter of the tank adjacent the heat exchange end; and
    a reinforcement structure encompassing the outer perimeter of the tank and disposed intermediate the tank and the outer wall of the header, wherein the reinforcement structure is formed from a metal having an electrode potential less than an electrode potential of the tank, wherein the reinforcement structure includes opposing ends and a locking feature joining the ends to secure the reinforcement structure about the tank, and wherein the locking feature is integrally formed with the reinforcement structure.

11. The tank assembly of claim 10, wherein the locking feature has a fastener disposed at a first one of the ends of the reinforcement structure and a slot formed at a second one of the ends of the reinforcement structure configured to receive the fastener.

12. The tank assembly of claim 10, wherein the reinforcement structure is fixed within the outer perimeter of the tank.

13. The tank assembly of claim 10, wherein the reinforcement structure is a sacrificial anode.

14. The tank assembly of claim 10, wherein the header is crimped to the tank to cover a portion of the reinforcement structure.

15. A method of forming a tank assembly comprising the steps of:
    providing a tank having a heat exchange end defining an opening;

crimping a header to the tank at the heat exchange end of the tank;

forming a reinforcement structure having a shape corresponding to a shape of a perimeter of the tank from a metal having an electrode potential less than an electrode potential of at least one of the tank and the header; and positioning the reinforcement structure about the tank intermediate the tank and the header, wherein the reinforcement structure includes opposing ends and a locking feature joining the ends to secure the reinforcement structure about the tank, and wherein the locking feature is integrally formed with the reinforcement structure.

16. The method of claim 15, further comprising the step of molding the tank to the reinforcement structure.

17. The method of claim 15, wherein the step of forming the reinforcement structure includes the step of bending the reinforcement structure.

* * * * *